June 30, 1942.  L. S. WHITMIRE ET AL  2,288,507
GLASS BENDING FRAME
Filed July 27, 1940  4 Sheets-Sheet 1

Inventors
LEROY S. WHITMIRE
CHESTER A. JUNCKER
By
Olen E. Bee
Attorney

June 30, 1942.                L. S. WHITMIRE ET AL                2,288,507
                                GLASS BENDING FRAME
                              Filed July 27, 1940           4 Sheets-Sheet 2

Inventors
LEROY S. WHITMIRE
CHESTER A. JUNCKER

By Olew E. Bee
Attorney

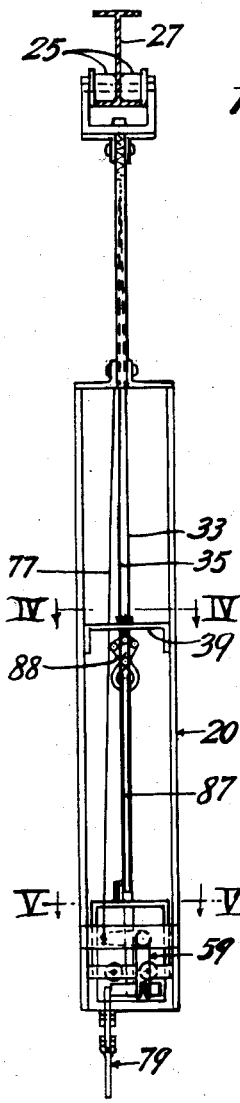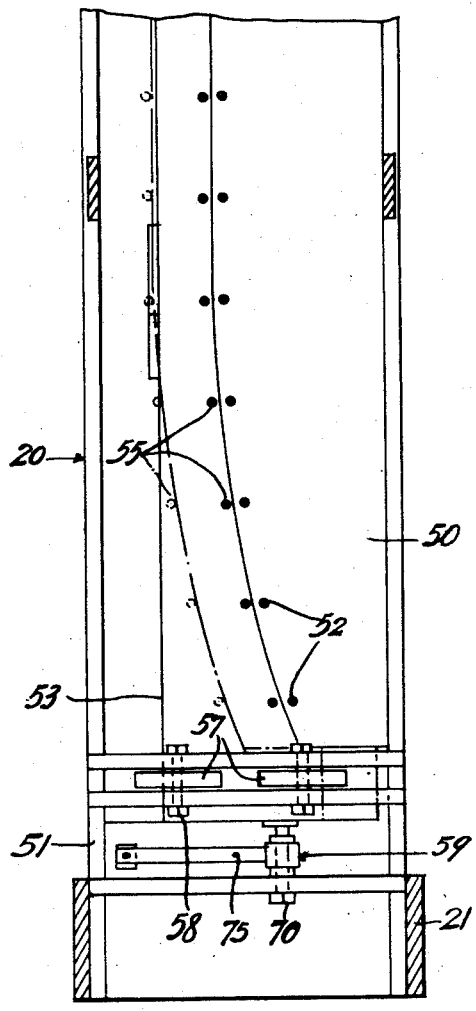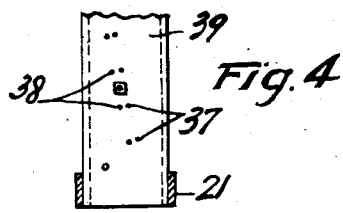

June 30, 1942.   L. S. WHITMIRE ET AL   2,288,507
GLASS BENDING FRAME
Filed July 27, 1940   4 Sheets-Sheet 4
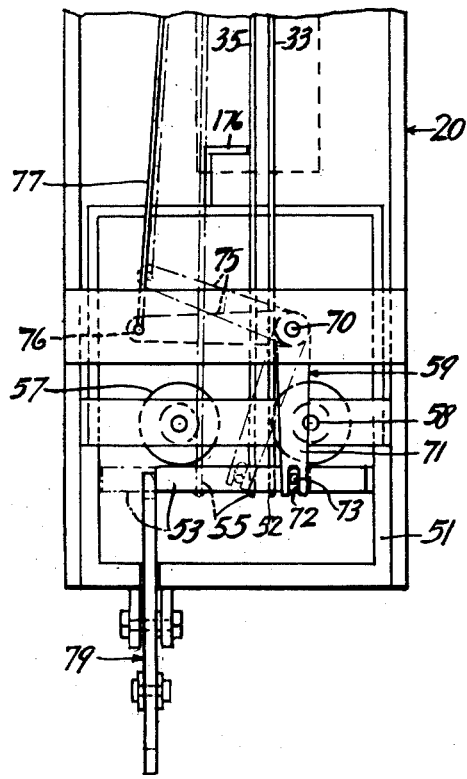
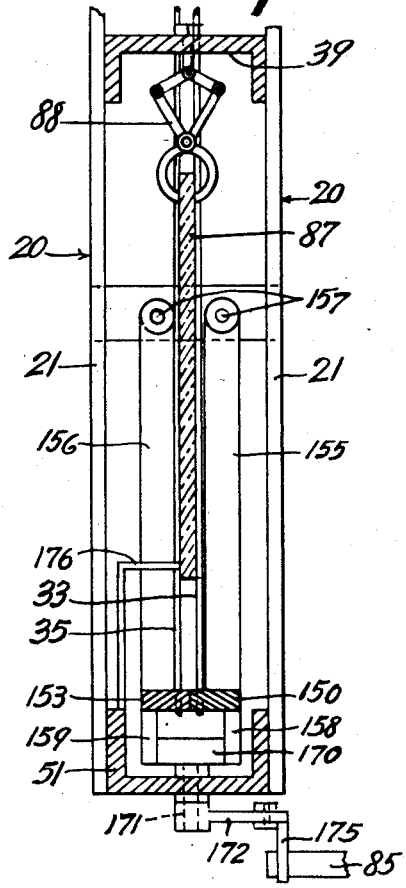
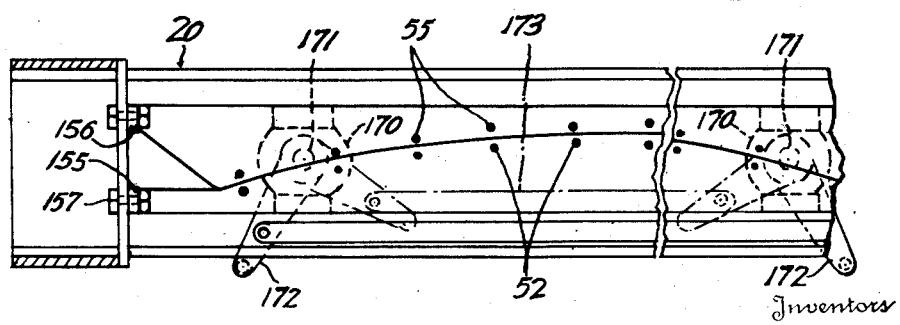
Inventors
LEROY S. WHITMIRE
CHESTER A JUNCKER
By Olew E. Bee
Attorney Patented June 30, 1942

2,288,507

UNITED STATES PATENT OFFICE 2,288,507

GLASS BENDING FRAME

Leroy S. Whitmire and Chester A. Juncker, Crystal City, Mo., assignors to Pittsburgh Plate Glass Company, a corporation of Pennsylvania Application July 27, 1940, Serial No. 347,970

8 Claims. (Cl. 49—45)

This invention relates to apparatus for handling sheet glass and it has particular relation to a structure for preventing the marring or streaking of sheet glass in bending operations by controlling the position of elements employed in connection with the bending action.

One object of the invention is to protect sheet glass from marring effect of wires or other bending members after the bending operation has been completed.

Another object of the invention is to provide an improved automatically operable device for relieving bending pressure on the sheet glass, particularly in the type of bending apparatus in which flexible elements are employed in forcing the glass into bent form.

Another object of the invention is to provide an improved mechanism for actuating glass bending elements to move them out of contact with the glass after the bending operations.

In the type of glass bending apparatus in which flexible members, such as wires, are employed, it has been found that if these members remain in contact with the surface of the glass while the latter is being cooled streaks will appear thereon. Although these streaks may be visible only when the glass is viewed from one angle they constitute a disadvantage and lower the quality of the glass. According to the invention a mechanism has been devised which, upon transportation of the glass from the heating and bending furnace, immediately operates to separate the wires and permit proper air circulation between such wires and the glass surface during the cooling period. The wires are arranged in two rows and their lower ends are connected to a pair of horizontal members, one or both of which may be movable, and tripping devices are provided which actuate the mechanism in separating these members in response to movement of the glass supporting structure out of the furnace.

Figure 1:
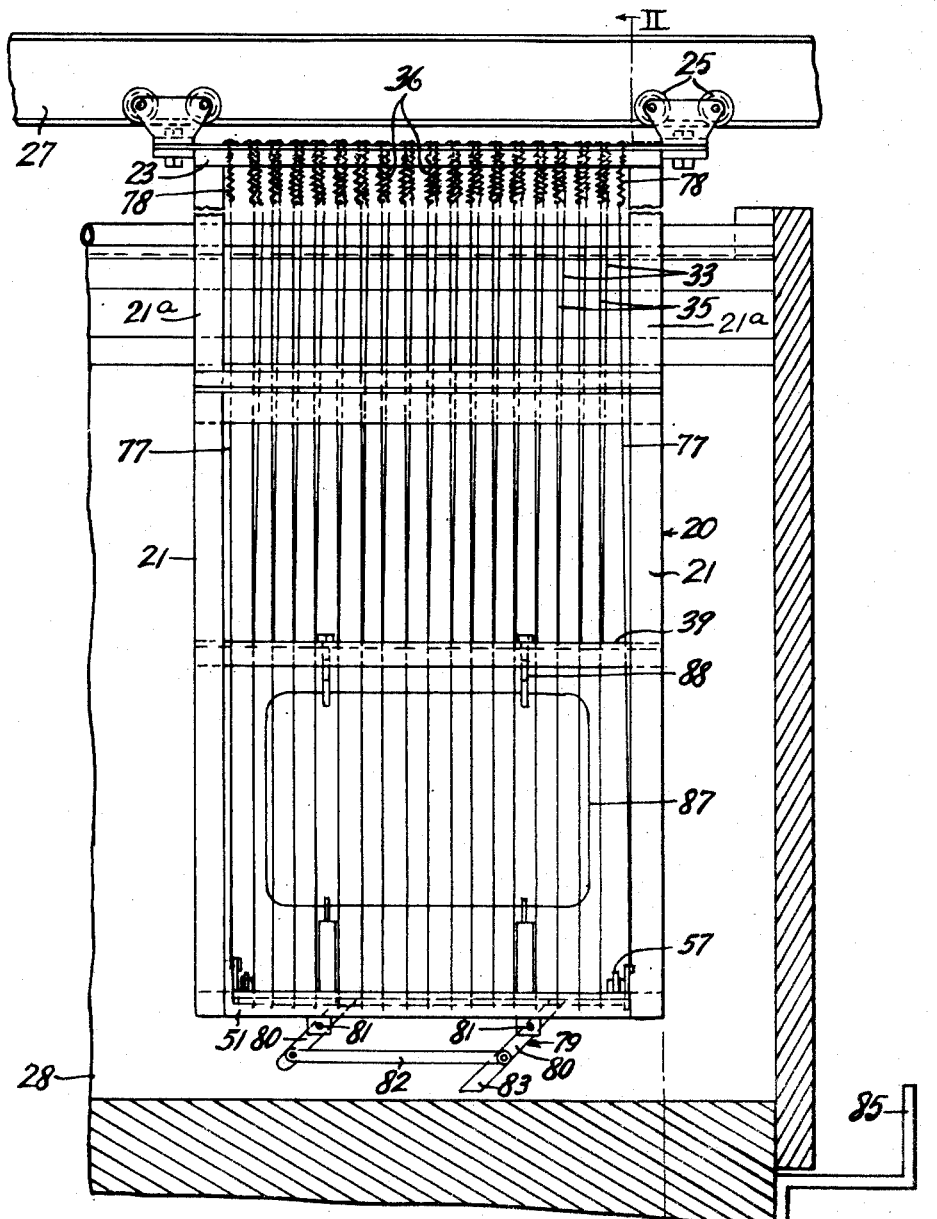
Figure 2:
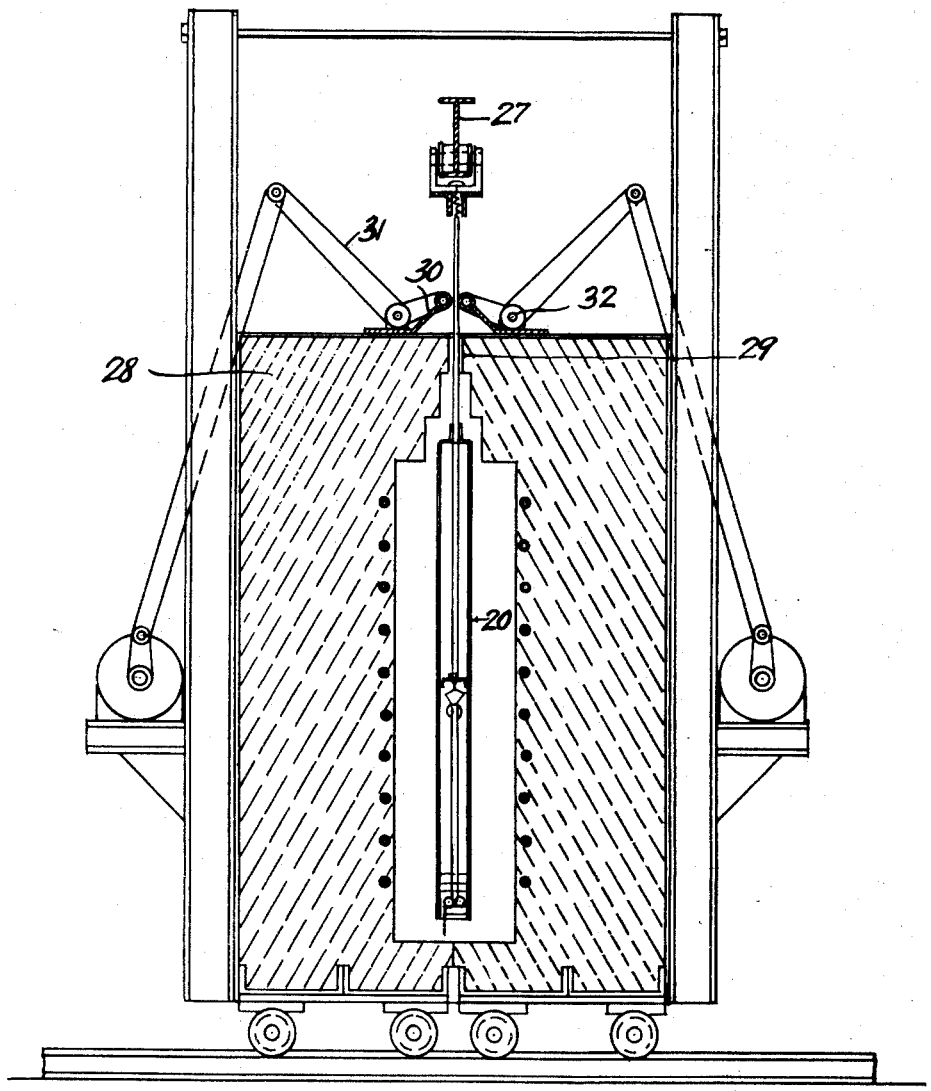

In the drawings Figure 1 is a fragmentary vertical section of a glass heating furnace having a glass supporting device shown in elevation therein; Figure 2 is a vertical section taken substantially along the line II—II of Figure 1; Figure 3 is an end elevation of a glass supporting frame; Figure 4 is a fragmentary horizontal section taken substantially along the line IV—IV of Figure 3; Figure 5 is a fragmentary horizontal section, on a larger scale, taken substantially along the line V—V of Figure 3; Figure 6 is a fragmentary end elevation of mechanical features of the structure shown in Figure 3; Figure 7 is a fragmentary vertical section of another form of frame structure; and Figure 8 is a fragmentary plan of portions of the structure shown in Figure 7, other portions thereof being shown in horizontal section.

In practicing the invention a glass supporting frame 20, having vertical end members 21 and upper horizontal angle members 23, is provided with upper rollers 25 operable upon an overhead monorail 27. The frame is thus suspended for horizontal movement into and out of a furnace 28 of conventional construction. The upper portion of the furnace has a narrow passage 29 through which the upper portion of the frame is movable and this passage is substantially closed about the frame by means of suitable heat-resisting flexible material 30, adapted to contact opposite sides of the frame. The position of this material is controlled by conventional linkage 31 pivotally carried upon the furnace as shown at 32 in Figure 2.

Two series of substantially vertical wires 33 and 35 are provided with tension springs 36 at their upper ends and are anchored to the horizontal angle members 23 in a substantially vertical plane. It will be noted that the springs 36 for the wires 33 and 35 are suitably spaced upwardly from the upper side of the furnace and are shielded from heat by means of the flexible material 30. The intermediate portions of the wires 33 and 35 pass through pairs of gauging openings 37 and 38, respectively, (Fig. 4) that are formed in a horizontally disposed plate 39 secured intermediately of the frame between the vertical frame members 21. The latter members are arranged in pairs in the lower body portion of the frame which extends into the furnace and at the frame corners, while single upper frame members 21a provide for a narrow structure suitable for passing through the narrow passage 29. The openings 37 and 38 are arranged in a pair of rows and define predetermined curvature to which sheet glass is to be bent.

The lower ends of the series of wires 33 are secured to a horizontal stationary plate 50 mounted rigidly between lower horizontal members 51 of the frame, and points of connection 52 of these lower wire ends define a predetermined curvature disposed immediately below, and corresponding to, the curvature defined by the row of openings 37. The lower ends of the other series of wires 35 are similarly connected to a horizontal floating plate 53, movable laterally toward and away from the plate 50 in substantially the same horizontal plane. Points of connection 55 of the lower ends of these wires 33 normally are arranged immediately below the openings 38 and define a curvature corresponding to the curvature defined by the latter openings. The contiguous edges of the stationary plate 50 and the floating plate 53 are curved between the rows of connections 52 and 53 in conformity with the curvature of such rows, and when these edges are in contact with each other the spaces defined between the lower ends of the two series or rows of wires correspond substantially to the spaces between the wires at the location of their passage through the openings 37 and 38.

A pair of rollers 57 is mounted upon bearings 58 in the frame adjacent the opposite extremities of the latter and the upper surfaces of the floating plate 53 bear against these rollers under the influence of the springs 36 operating through the series of wires 35. Also a bell-crank 59 has a pivotal connection 70 in the frame at each end thereof adjacent each end of the floating plate 53. One bell-crank arm 71 which is normally vertically disposed has at its lower end a slotted portion 72 which receives a pin 73 rigid on the end of the floating plate 53. A normally horizontal arm 75 of each bell-crank is connected at its outer end, as indicated at 76, to a lower end of a wire 77 passing upwardly through the intermediate plate 39 and is connected by means of a spring 78 to the upper portion of the frame adjacent the other springs 36. The springs 78 constantly exert forces tending to pivot the bell-crank 59 in a clockwise direction (Fig. 6) and thereby move the floating plate 53 horizontally from right to left as viewed in this figure.

A latch structure 79 having parallel latch members 80 pivoted to the frame, as indicated at 81, includes a horizontal link 82 pivoted at opposite ends to the latch members. The latter members thus operate in parallelism. One of the latch members has a lower extension 83 which is adapted to engage a tripping member 85 secured to the furnace structure adjacent the exit portion thereof. The upper ends of the latch members normally engage the outer edge of the floating plate 53 and hold the latter in edge to edge contact with the stationary plate 50. When the extension 83 strikes the tripper 85 the latch members release the floating plate which, under the influence of the bell-crank 59 and springs 78, swings outwardly away from the stationary plate 50. This action is facilitated by the bearing of the upper surfaces of the plate 53 adjacent its end portions against the rollers 57.

In the operation of the device a flat glass sheet 87 is suspended between the two series of wires 33 and 35 by means of conventional tongs 88 and the bending operation is performed substantially in the same manner as that described in the application of L. V. Black et al., Serial No. 198,870, filed March 30, 1938, for Process and apparatus for bending glass sheets.

After the bending operation the frame 20 is moved out of the furnace on the monorail 27, and the latch structure 79, by striking the tripper 85, releases the floating plate 53 to permit the wires 35 on one side of the glass to swing out of contact therewith. The tongs 88 are so arranged that the glass after bending tends to tilt slightly away from the series of wires 33. Hence, the glass sheet is substantially out of contact with both series of wires 33 and 35 after the latch has been tripped.

Referring to Figures 7 and 8, another application of the invention is illustrated wherein a frame structure 20 can be employed in the same arrangement as that described with reference to Figures 1 to 6. This structure includes two horizontally movable plates 150 and 153 at the bottom portion of the frame. Upright links 155 and 156, which have their lower ends secured to the opposite ends of the plates 150 and 153, respectively, are suspended by means of pivotal connections 157 securing their upper ends to an intermediate portion of the frame. Flanges 158 and 169 extending integrally and downwardly in opposed relation to each other from the plates 150 and 153, respectively, receive between them a pair of cam members 170, which are rotatably mounted, as indicated at 171, upon vertical axes in the frame. These cams have horizontally disposed parallel arms 172 extending rigidly therefrom and are pivotally connected to opposite ends of a connecting link 173 for movement in parallelism. The outer end of each arm is provided with a downwardly projecting finger 175, which is adapted to strike the tripping member 85 and such action rotates the cams 170 about their vertical axes to separate the plates 150 and 153. The two series of wires 33 and 35 which are connected to these plates are thus separated. In this arrangement it is of course to be understood that the wires 77 are not required. If desired, steadying fingers 176, mounted upon the frame adjacent the location of the glass, can be provided to prevent the glass from swinging unduly after the wires of the two series have been separated.

Although more than one form of the invention has been shown and described in detail it will be apparent to those skilled in the art that the invention is not limited to such forms, but that various changes can be made therein without departing from the spirit of the invention or from the scope of the appended claims.

What we claim is:

1. In a frame for supporting sheet glass and including wires suspended in a pair of rows from the upper portion of the frame for embracing the glass on its opposite sides, members supporting the lower end of the wires, and means for actuating one row of wires away from the other row to release the glass from contact therewith.

2. In a frame for supporting sheet glass including two rows of wires suspended from the upper portion of the frame for embracing the glass on its opposite sides, means for suspending the sheet glass between the two rows of wires, means for supporting one row of wires at their lower ends in relatively movable relation to the other row of wires.

3. In a frame for supporting sheet glass and including two rows of wires suspended from the upper portion of the frame for embracing the glass on its opposite sides, means for suspending the sheet glass between the rows of wires, means for supporting one row of wires at their lower ends in laterally movable relation to the other row of wires, means for tensioning the wires, and actuating mechanism operatively associated with the wire supporting means for moving one row of wires relative to the other row.

4. In a frame for supporting sheet glass and including two rows of wires suspended from the upper portion of the frame for embracing the glass on its opposite sides, a pair of horizontal members in the lower portion of the frame having the lower ends of the respective rows of wires secured thereto, and means for laterally moving one of the members relative to the other member to spread the rows of wires.

5. In a frame for supporting sheet glass, two rows of wires suspended from the upper portion of the frame for embracing the glass on its opposite sides, a pair of horizontal members in the lower portion of the frame having the lower ends of the respective rows of wires secured thereto, means for laterally moving one of the members relative to the other member, and tripping mechanism associated with the latter means and operable to initiate actuation of the latter means.

6. In a frame for supporting sheet glass, two rows of wires suspended from the upper portion of the frame for embracing the glass on its opposite sides, a pair of horizontally disposed members in the lower portion of the frame having the lower ends of the respective rows of wires secured thereto, means constantly exerting force tending to move one of the members laterally away from the other member, means releasably locking the members in close proximity to each other, and tripping mechanism associated with the locking means and actuatable to release the latter means.

7. In a frame for supporting sheet glass, two rows of wires suspended from the upper portion of the frame for embracing the glass on its opposite sides, a stationary member rigid in the frame securing the lower ends of the wires of one row in a predetermined position, a movable member normally supporting the lower ends of the other row of wires adjacent and in substantial parallelism to said one row of wires, a bell-crank pivoted in the frame and having means for actuating it into engagement with the movable member whereby the latter is moved away from the stationary member, and means for actuating the bell-crank.

8. In a frame for supporting sheet glass, two rows of wires suspended from the upper portion of the frame for embracing the glass on its opposite sides, a stationary member rigid in the frame securing the lower ends of the wires of one row in a predetermined position, a pair of relatively movable members supporting the lower ends of the two rows of wires in the frame, a cam member rotatable between the relatively movable members to spread them in response to rotation of said cam, and means for actuating the cam and thereby spreading the members carrying the lower ends of the wires.

LEROY S. WHITMIRE.
CHESTER A. JUNCKER.